United States Patent
Krueger et al.

(10) Patent No.: US 7,530,303 B2
(45) Date of Patent: May 12, 2009

(54) CHEESE WHEEL CUTTER

(75) Inventors: Randall George Krueger, Weyauwega, WI (US); Michael John Willner, Montello, WI (US)

(73) Assignee: Kraft Foods Global Brands LLC, Northfield, IL (US)

( * ) Notice: Subject to any disclaimer, the term of this patent is extended or adjusted under 35 U.S.C. 154(b) by 1199 days.

(21) Appl. No.: 10/813,645

(22) Filed: Mar. 30, 2004

(65) Prior Publication Data

US 2005/0217502 A1    Oct. 6, 2005

(51) Int. Cl.
- A01J 11/00    (2006.01)
- B26D 1/02    (2006.01)
- A23C 9/12    (2006.01)
- A23C 19/00    (2006.01)

(52) U.S. Cl. .............. 99/452; 83/857; 426/36; 426/582

(58) Field of Classification Search ............ 99/452; 426/36, 582; 83/857
See application file for complete search history.

(56) References Cited

U.S. PATENT DOCUMENTS

| | | | |
|---|---|---|---|
| 236,178 A | 1/1881 | Rice | |
| 714,943 A | 12/1902 | Perkins | |
| 1,443,281 A | 1/1923 | Schoenborn | |
| 1,477,106 A | 12/1923 | Caldwell | |
| 1,496,917 A | 6/1924 | Baerenfaenger | |
| 2,244,972 A * | 6/1941 | Stumpf | 473/233 |
| 3,077,215 A | 2/1963 | Kentor | |
| D246,411 S | 11/1977 | Blanchard | |
| 4,111,087 A | 9/1978 | Pankratz et al. | |
| 4,208,931 A | 6/1980 | Collins | |
| 4,297,932 A | 11/1981 | Wells, Jr. et al. | |
| 4,342,242 A | 8/1982 | Schaum | |
| 4,608,896 A | 9/1986 | Topp | |
| 4,646,602 A | 3/1987 | Bleick | |
| 5,009,141 A | 4/1991 | Julian et al. | |
| 5,058,478 A | 10/1991 | Mendenhall | |
| 5,095,794 A | 3/1992 | Mendenhall | |
| 5,125,308 A | 6/1992 | Mendenhall | |
| 6,086,934 A * | 7/2000 | Khatchadourian et al. | 426/289 |
| 7,044,518 B2 * | 5/2006 | Lang et al. | 294/7 |
| 2003/0234188 A1* | 12/2003 | McGuyer | 206/223 |
| 2004/0231526 A1* | 11/2004 | Childress | 99/386 |
| 2005/0181098 A1* | 8/2005 | Montague | 426/94 |

FOREIGN PATENT DOCUMENTS

| | | |
|---|---|---|
| DE | 1 127 657 | 4/1962 |
| DE | 1 816 008 | 6/1970 |
| GB | 941941 | 11/1963 |

* cited by examiner

*Primary Examiner*—Daniel L Robinson
(74) *Attorney, Agent, or Firm*—Fitch, Even, Tabin & Flannery

(57) ABSTRACT

A cutter for sectioning cheese in the form of a wheel. The cutter includes an apparatus for a cheese wheel to be divided by a set of horizontal or inclined staggered blades into smaller wheels, the cheese then being placed onto a platform. Another set of blades with a different orientation such as vertical then pass through the smaller wheels. The second set of blades may include one cylindrical blade removing an outer periphery and providing a uniform outer diameter and may include a plurality of linear, diametral blades sectioning each smaller wheel into portions or wedges. A second apparatus moves the portions or wedges to be packaged from the platform, and then retracts so the second set of blades and platform may return to a position for sectioning or portioning a second cheese wheel.

19 Claims, 4 Drawing Sheets

CHEESE WHEEL CUTTER

FIELD OF THE INVENTION

The invention relates to slicing or cutting machines for cheese blocks, specifically to a method and apparatus for slicing a cheese wheel into a plurality of wedges or other shapes.

BACKGROUND OF THE INVENTION

Certain types of cheese are formed and produced in large circular blocks or wheels which are cut to smaller sizes for sale. A cheese wheel often has a substantially flat top and bottom and has a curvilinear outer circumferential surface. Some examples of cheese types produced in a wheel include hard cheeses such as Parmesan, Romano, Asiago, and Pecorino, as well as soft cheeses such as Gouda and Edam.

Although cheese production is a carefully monitored process, the size and shape of a block of cheese can only be controlled to a certain extent. Accordingly, the outer peripheral (diametral) dimension of a block quantity, or wheel, often varies. At retail or wholesale, cheese is often sold by weight, or in uniform sizes and shapes. Because of the variance in the size or shape of an unprocessed block of cheese, steps must be taken to produce cheese portions with a specified size.

In dimensioning portions of a cheese wheel, a device or tool is typically used to cut the cheese wheel. When a cutting device or tool passes through cheese, the interface between the tool and the cheese generates high levels of friction. When a slicing blade passes through cheese and the two sides of the cut are unable to deflect away from the surface of the blade, the cheese presses against the sides of the blade, resulting in high levels of friction. In order to reduce friction, it is preferred that the cheese separate from the sides of the blade. When multiple blades pass through a cheese wheel simultaneously, the ability of the sides of the cut to deflect from the blade may be reduced, and increased friction may result. Such friction can create irregular or damaged edges on the cut cheese, requires more power, and produces greater wear and tear on the cutting device.

In order to reduce friction, it is common for a cutting system to employ wires as cutting devices. However, a wire cut can be difficult to control with precision.

The height of a cheese wheel is often such that it is desirable to cut the wheel laterally, transverse to the central axis of the wheel. This results in stacked slabs or partial wheels, or smaller wheels. The slabs are also frequently cut to wheel wedges or food service quarters, in which the dictates of exact size and weight packaging for commercial uses must be followed. Accordingly, as the size of a wheel tends to vary, the production of specific-sized portions often requires removing the outer diametral periphery of the wheel to obtain a uniform diameter for the cheese wheel.

One method for cutting a cheese wheel involves using a manually-operated band saw. In this method, cheese wheels are first uwrapped and placed on a plastic lined pallet. One wheel is then secured in a fixture and placed on a band saw table. The fixture is manually adjusted for cutting the wheel into two identical halves. The wheel is then fed against the open blade. Once cut, the two halves are retrieved from behind the blade. Next, one of the halves is again placed in the fixture, which is adjusted so that the half is then cut into quarters. The quarters are then retrieved, and the other half is then placed in the fixture and cut. The fixture is then removed and a second fixture is utilized for cutting each of the four quarters into eighths. The eighths then are sequentially secured in a third fixture for making additional cuts.

There is a need for a more efficient method of dividing large masses of cheese.

BRIEF SUMMARY OF THE INVENTION

The invention provides an improved system for dividing cheese wheels and other larger masses into smaller portions. The system utilizes a plurality of cutters such as blades, and preferably the blades are staggered in the direction of movement. In other words, as the cheese is being cut by two or more blades, it is preferred a cross-sectional plane orthogonal to the direction of the movement of the cheese relative to the blades intersects fewer than all of the blades. Where more than one blade is present in any cross-sectional plane orthogonal to the movement, compression may result in friction. This may be avoided by staggering the blades.

The system may include a horizontal set of blades oriented to portion the cheese in a horizontal direction and a vertical set of blades oriented to portion the cheese wheel in a vertical direction where the blades of one or both sets may be staggered, and the system may include a pusher, plunger, ram, or other member for displacing the cheese wheel through one set of blades and into a position for the second set of blades to portion the cheese wheel, and/or a platform onto which the cheese may be displaced, preferably by the plunger. The plunger may physically pass below the horizontal set of blades while displacing the cheese. The horizontal set of blades may portion the cheese wheel into smaller wheels with substantially identical height. In some embodiments, the blades may be stationary. In other embodiments, the cheese may be stationary, and the blades moved through the cheese. In still other embodiments, both the cheese and the blades may be in motion.

The horizontal set of blades may be staggered so the blades do not overlap in any lateral, vertical cross-section of the cheese wheel, i.e., any vertical cross-section orthogonal to the direction of movement. The plunger may displace the cheese wheel along a conveyor. The vertical blades may include a plurality of blades in chordal, diametral, radial, cylindrical circumferential, or other array. The platform may include channels for receiving the diametral blades, and the platform may be sized to avoid interference with the cylindrical blade. The platform may be cylindrical, and the channels may have staggered depths corresponding to the staggered vertical blades.

The vertical blades may be secured at their ends. The system may further include a cylinder or shell wherein the vertical blades are supported by and secured to an inner surface of the cylinder. The vertical blades may be secured to an inner surface of the cylinder. The system may further includes a plurality of threaded posts passing through the wall of the cylinder, wherein the vertical blades includes a threaded receiver each receiving a threaded post for securing one of the vertical blades in the cylinder. The vertical blades may be staggered so the blades do not overlap in any horizontal cross-section of the cheese wheel.

The system may further include a mechanical drive, secured to the cylinder by a bracket, for moving the second set of blades in a vertical direction, and may further include a plunger for removing the cheese from the platform after the cheese has been cut. The bracket may include two or more arms mounted to the periphery of the cylinder, wherein the two arms are connected at a distance above the cylinder to avoid interfering with the cheese as the vertical set of blades passes through the cheese. The bracket may permit the plunger to displace the cheese from the platform after the cheese has been cut while the vertical blades are in a lowered position beneath the cheese. The plunger for removing the cheese from the platform may displace the cheese onto a conveyor after the cheese has been cut.

Operation of the system may comprise displacing cheese through a series of horizontally oriented blades with a first plunger, displacing the cheese onto a platform, lowering a series of vertically oriented blades, displacing the cheese off the platform with a second plunger, retracting the plunger, and thereafter raising the series of vertically oriented blades. The step of displacing the cheese with a first plunger may include displacing the cheese along a conveyor. The step of lowering the series of vertically oriented blades may include lowering the blades through channels in the platform. The step of lowering the series of vertically oriented blades may include lowering a cylindrical blade over and/or around the platform. The step of displacing the cheese off the platform may include displacing the cheese onto a conveyor.

DETAILED DESCRIPTION OF THE PREFERRED EMBODIMENTS

Figure 1:
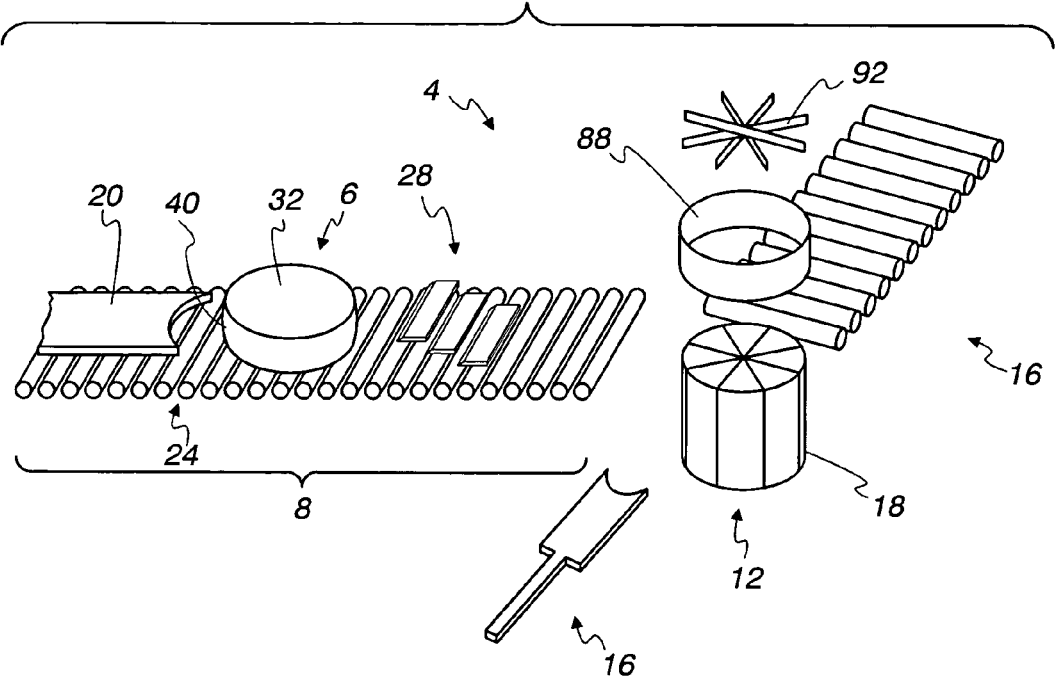
FIG. 1 is a perspective view of an embodiment of a cheese wheel cutter.
Figure 2:
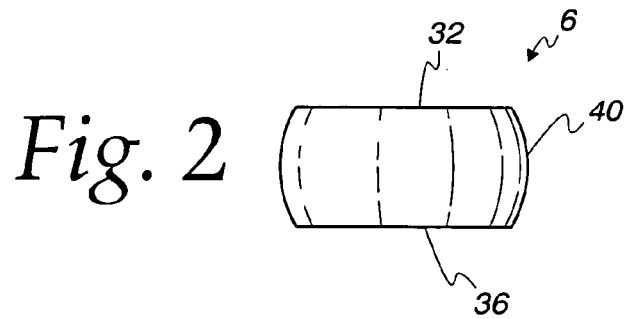
FIG. 2 is a side elevation view of a cheese wheel.

Referring initially to FIG. 1, a cutter 4 of the present invention is depicted with a cheese wheel 6 including a first stage 8, a second stage 12, and a finish stage 16. The first stage 8 includes a plunger 20, a conveyor 24, and a first set of longitudinally arranged cutters such as blades 28. As seen in FIGS. 1 and 2, the cheese wheel 6 has a generally flat top side 32, a generally flat bottom side 36, and an outer periphery 40 with a curvilinear profile.

Figure 3:
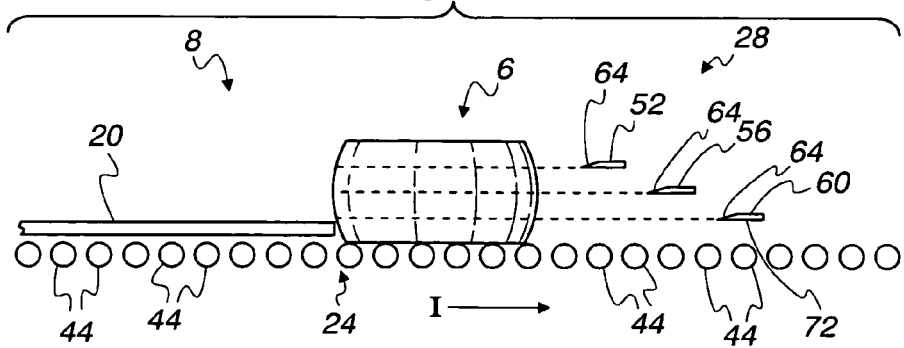
FIG. 3 is a side elevation view in cross-section of a cheese wheel and a first stage of the cutter of FIG. 1.

Viewing FIG. 3, the first stage 8 is depicted. The plunger 20 may be a pneumatically actuated plunger which reciprocates horizontally in a linear fashion. The plunger 20 may also be any other type of member which directs the cheese wheel, either prior to or after being cut, from one position to another. The plunger 20 displaces the cheese 6 along the conveyor 24 in the direction of arrow I. The conveyor 24 may be any conveyor system suitable for transporting food products. In the illustrated embodiment, the conveyor 24 is a roller-element conveyor including a plurality of freely-rotating rollers 44 so that the movement of the cheese 6 is dictated by the plunger 20.

In the present form, the first stage 8 is equipped to portion the cheese 6 into four smaller wheels 48 (see FIG. 6) with substantially identical heights. In order to do so, the first stage 8 is equipped with a first set of blades 28 including a first horizontally arranged blade 52, a second horizontally arranged blade 56, and a third horizontally arranged blade 60. Each of the blades is equally spaced from the adjacent blade (s), i.e., each adjacent pair of blades are separated by a uniform distance. A fourth blade (not shown) may be provided to profile the wheel, i.e. to trim the top of the wheel to level it and provide it with a predetermined height. The fourth blade may be spaced from the highest of the three illustrated blades by the same uniform distance mentioned above.

As the cheese 6 is pushed by the plunger 20 over the conveyor 24, the first horizontal blade 52 enters and cuts the cheese 6. Each of the horizontal blades 52, 56, 60 has a front cutting edge 64. Accordingly, as the first horizontal blade 52 passes through the cheese, the uppermost smaller wheel 48 is lifted up so the friction is reduced between the cheese 6 and each horizontal blade 52, 56, 60.

All of the horizontal blades are preferably staggered along the path of the cheese to reduce the friction between the horizontal blades and the cheese 6. In some embodiments, only one horizontal blade is present in any vertical, lateral cross-section of the cheese 6 in order to allow the smaller wheels 48 to deflect as they are being cut by a horizontal blade, thereby reducing friction.

Figure 4:
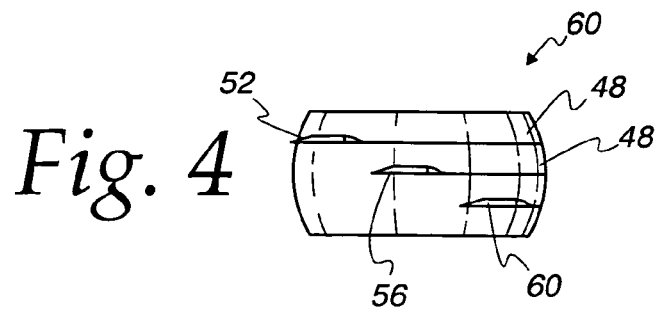
FIG. 4 is a side elevation view in cross-section of the cheese being cut in the first stage of FIG. 3.
Figure 6:
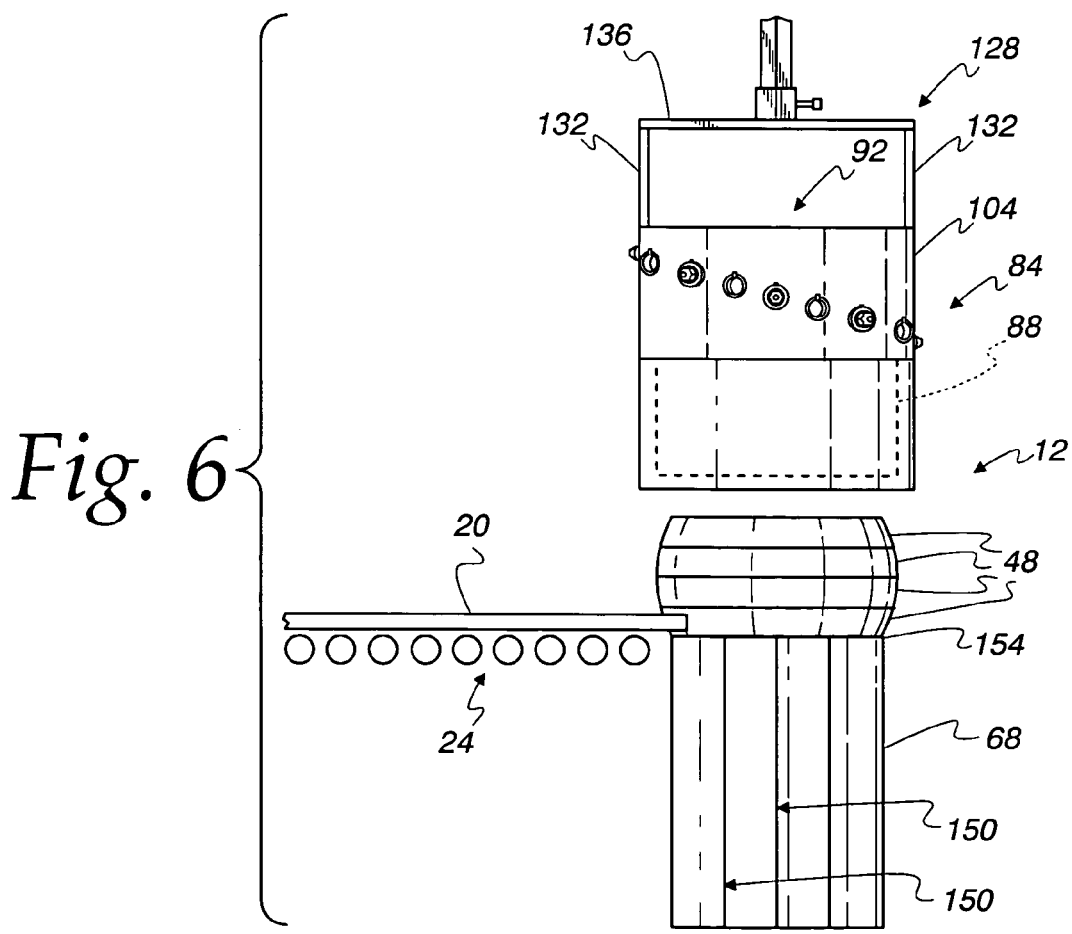
FIG. 6 is a side elevation view of a second stage of the cutter of FIG. 1.

The plunger 20 continues to drive the cheese 6 through the first set of blades 28 until the smaller wheels 48 rest on a platform 68 of the second stage 12 (see FIG. 6). It should be noted that the cheese wheel 6 and blades 28 move relative to each other, and that, alternatively, the plunger 20 may be used to hold the cheese 6 in a stationary position as the blades 28 moved to pass through the cheese 6. In such a case, the plunger 20 may direct the cheese 6 onto the platform 68 in a separate step from the cutting by the blades 28, or the platform may be moved into position under the cheese. As can be seen in FIG. 4, once a first smaller wheel 48 has been cut, it rests on the smaller wheel 48 below it and continues through the first stage 8 drawn by friction between itself and the smaller wheel 48 below it. Each successively cut smaller wheel 48 is drawn along in the same manner. In order to drive the cheese 6 until all the smaller wheels 48 rest on the platform 68, the plunger 20 is sized so as to pass between a bottom side 72 of the third horizontal blade 60 and the roller elements 44 of the conveyor 24. In another form (not depicted), the plunger 20 may be configured to include horizontal channels for receiving each of the horizontal blades 52, 56, 60 such that the plunger 20 provides a displacing force along the face of the cheese 6 and the smaller wheels 48 continue to be displaced by the plunger 20 without relying on friction between the smaller wheels 48. In another form, more than one blade may be present in a vertical, lateral cross-section of the cheese 6, though this requires the cheese 6 to be slightly compressible to accommodate the width of the horizontal blade 52, 56, 60 and requires a plunger with a geometry which permits the plunger to force all portions of the cheese through the blades 52, 56, 60, such as a plunger with horizontal channels as described above.

In the present form, the horizontal blades 52, 56, 60 are configured relative to each other and to the conveyor 24 so that the smaller wheels 48 have generally identical height. In another form, the height of the smaller wheels 48 may be varied according to desired final sizes by varying the placement and configuration of the horizontal blades 52, 56, 60.

Figure 5:
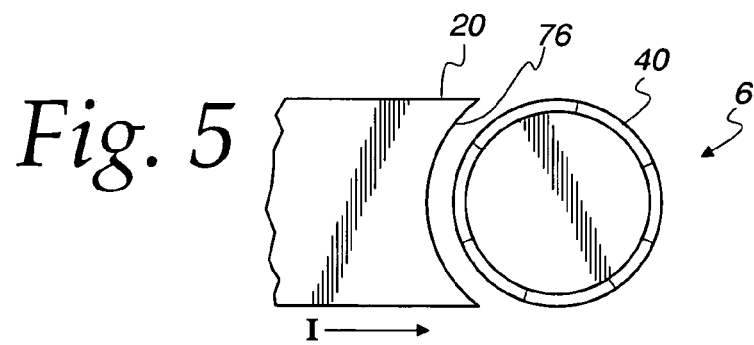
FIG. 5 is a fragmentary top plan view of a cheese wheel and a first plunger.

As can be seen in FIG. 5, the plunger 20 has a curved front profile 76. Although the cheese 6 is somewhat elastically compressible, the plunger profile 76 is shaped to generally mate and abut the circumference 80 of the cheese 6. This allows the plunger 20 to provide to the cheese 6 a laterally distributed force in the direction I.

Figure 9:
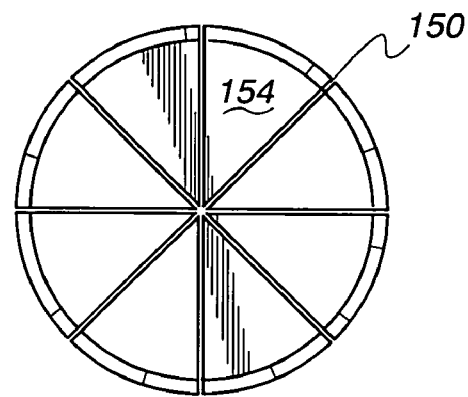
FIG. 9 is a top plan view of a platform of the second stage of FIG. 5.

Referring now to FIG. 6, the second stage 12, the conveyor 24, and the plunger 20 are depicted. As stated above, the plunger 20 drives the smaller wheels 48 of cheese 6 over the roller elements 44 of the conveyor 24 into the second stage 12. The second stage 12 includes a vertically arranged second set of cutters such as blades 84 and the platform 68. The plunger 20 drives the cheese 6 onto a top surface 154 of the platform 68 (FIG. 9). The platform 68 is a material or surface suitable for processing food fit for human consumption.

Figure 7:
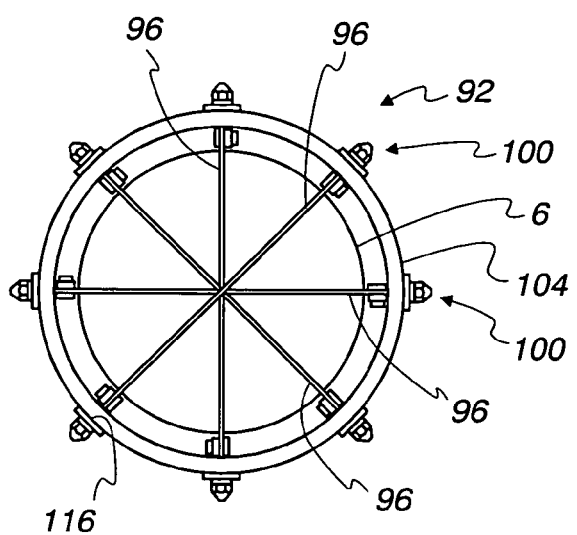
FIG. 7 is a top plan view of a cheese wheel and a set of staggered blades of the second stage of FIG. 5.

The vertical blades 84 of the second stage 12 cut the outer periphery 40 of the cheese 6 to a uniform diametral size, and portion the trimmed smaller wheels 48 into desired size and/or shape. The vertical set of blades 84 includes a vertically arranged cylindrical blade 88 and a set of vertically arranged and staggered blades 92 (FIG. 7). The vertical set of blades 84 is actuated in a vertical, linear orientation. Similarly to the horizontal blades 28, it should be noted that the cheese wheel 6 and blades 84 move relative to each other, and that, alternatively, the blades 84 may be in a stationary position and the platform 68 may be moved to drive the cheese 6 through the blades 84. The cylindrical blade 88 trims the periphery of the smaller wheels 48 to a generally uniform diametral size. The diametral blades 92 portion the smaller wheels 48 into desired shape, typically identical wedges.

Figure 8:
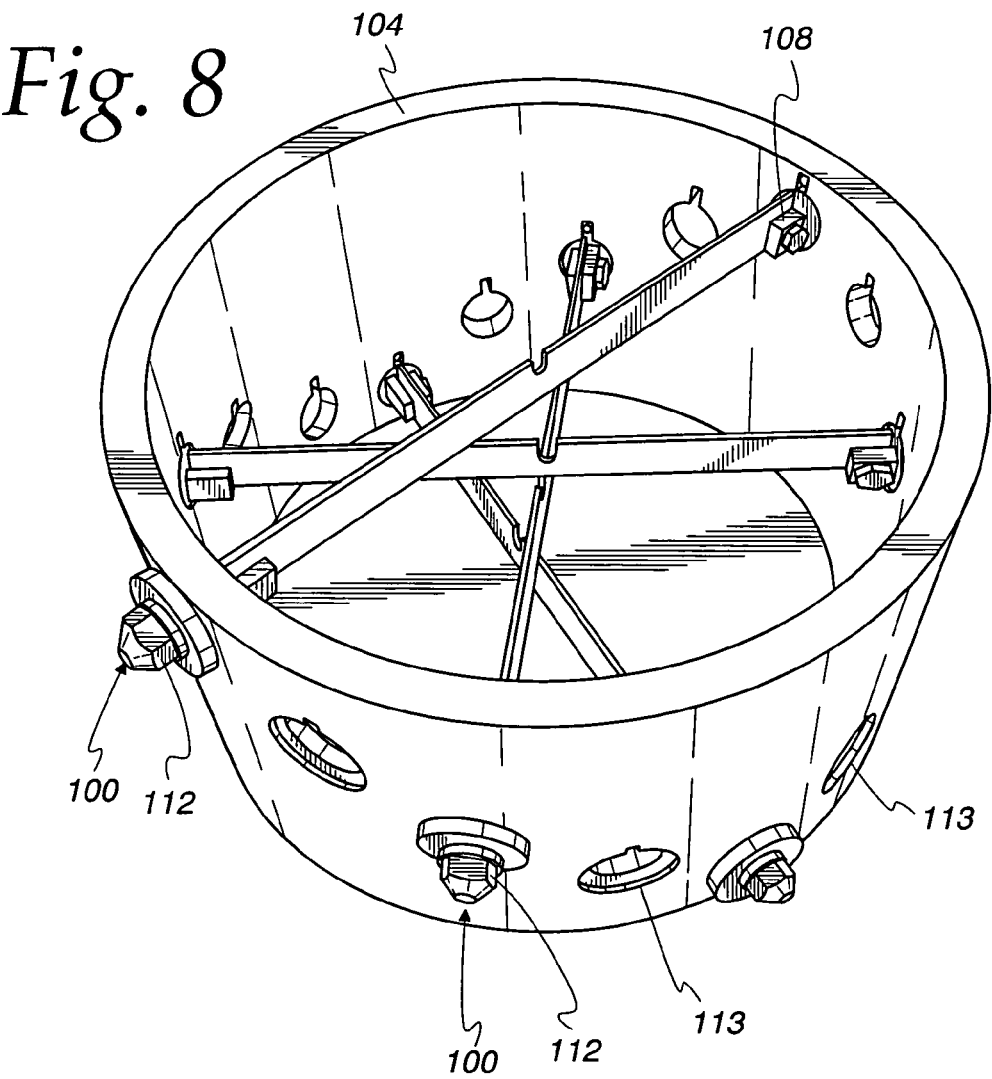
FIG. 8 is a perspective view of the staggered blades of FIG. 7.

FIGS. 6-8 depict a configuration for the set of the vertical blades 92. The set of vertical blades 92 are diametrially arranged in a cylinder or shell 104 and include a plurality of diametral blades 96 secured by mounts 100 in the cylinder 104. Each mount 100 includes a threaded fixture 108 which mates with a threaded post 112 through a socket 113 in the cylinder 104. The threaded fixture 108 is bracketed to an end 116 of one of the diametral blades 96. When the threaded post 112 is rotated in the manner a screw normally is, tension on the diametral blades 96 is provided for securing the blades 96. In order to minimize friction, in one form the blades 96 are staggered so that any horizontal cross-section of the smaller wheels 48 has only one blade passing through at a particular moment, minimizing friction between the cheese 6 and the blades 96. In another form, the blades 96 are staggered though not so that any horizontal cross-section of the smaller wheels 48 has only one blade passing through at a particular moment, in which case the cheese 6 should be slightly compressible to provide for the width of the blades 96. The inner diameter of the shell or cylinder 104 is larger than the outer diameter of the cheese 6 so that the resulting cut portions 120 (FIG. 11) may move outward (radially) to provide for easier passage of the blades 96.

The cylinder 104 and the vertical blades 84 are driven in a vertical path for cutting, raising and lowering. The cylinder 104 is raised and lowered by a drive system which may be pneumatically or otherwise powered and which is connected to the cylinder 104 by a bracket 128. The bracket 128 has two arms 132 diametrally mounted to the cylinder 104 for raising and lowering the cylinder 104 and the blades therein. The arms 132 are connected by a crossbar 136 to which the driving means, such as a pneumatic cylinder or electric motor, is attached or in communication. After all the blades 96 pass through the cheese 6, a plurality of portions 142 result (see FIG. 11 and accompanying discussion). The arms 132 are of a length L such that clearance is provided below the crossbar 136 and the platform 68 for the cheese portions 142 and a finish stage plunger 124 to pass through. After the cheese 6 has been cut into portions 142, the finish stage plunger 124 drives the portions 142 onto a finish stage conveyor 146 and then retracts, after which the cylinder 104 is raised and the vertical blades 96 are returned to a position for cutting a subsequent cheese 6.

In viewing FIGS. 6 and 9, the platform 68 is seen as generally cylindrical. The platform 68 includes a plurality of diametral channels 150. Once the blades 96 have passed through the cheese 6, the platform 68 must receive the staggered blades 96. Accordingly, the diametral channels 150 of the platform 68 are respectively staggered in depth from a top surface 154 of the platform 63.

Figure 10:
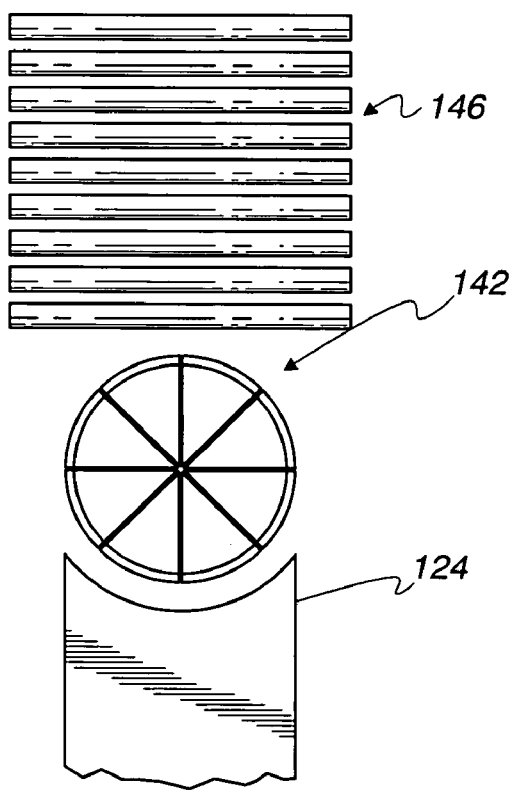
FIG. 10 is a top plan view in partial fragmentary of a portioned cheese and a second plunger.

Referring now to FIG. 10, the portions 142 are depicted with the finish stage conveyor 146 and the finish stage plunger 124. The plunger 124 drives the portions 142 onto the conveyor 146, and the portions 142 are then displaced to a packaging machine (not shown).

The finish stage conveyor 142 and finish stage plunger 124 are oriented such that their paths of motion do not interfere with the path of the conveyor 24 and plunger 20. The conveyor 146 may be any type of conveyor. The conveyor 146 may be provided with a power drive (not shown) for displacing the portions 142 along its path. Alternatively, the conveyor 146 may be declined downward such that gravity draws the portions 142 along its length, the conveyor 146 may require a manual operator to draw the portions 142 along the conveyor 146, or may rely on portions of a second cheese wheel to be pushed by the finish stage plunger 124 on to the conveyor 146, thereby forcing the portions 142 along the conveyor 146. Once the portions 142 have been cleared from the platform 68, the second stage plunger 124 retracts, the vertical blades 84 are raised, and the platform 68 is ready to receive a next plurality of smaller wheels 48.

Figure 11:
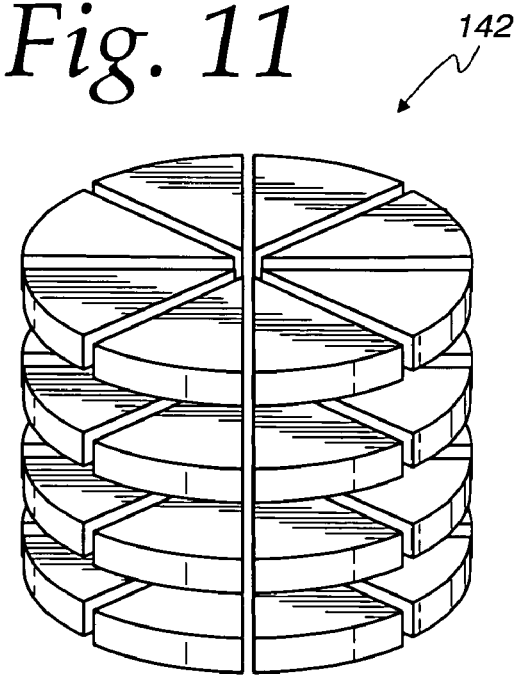
FIG. 11 is an exploded view of a portioned cheese wheel.

As can be seen in FIG. 11, in this form the cheese 6 is cut into thirty-two equally sized and shaped portions by using three horizontal blades 52, 56, 60 and four vertical diametral blades 96. The four diametral blades 96 correspond to respective diametral channels 150 in the platform 68. However, by using a different number of horizontal blades 52, 56, 60 or vertical diametral blades 96, the number of portions 142 resulting from cutting a single cheese wheel 6 may be altered. In addition, the orientation and/or spacing of the blades 52, 56, 60, 96 may be altered to produce portions 142 of non-uniform size. The apparatus preferably includes at least two distinct sets of blades that move relative to a slab or wheel of cheese, each making a separate pass and the blades of each set having an orientation different from that of the other set of blades. In other words, the horizontal blades could be slanted in one direction, and/or the vertical blades slanted in a second direction.

As mentioned, cheese 6 may be cut using the cutter 4 in a variety of configurations. As cheese portions 142 maybe retailed as exact weight or random weight, the cutter 4 is configurable for both. The above discussion details the cutter 4 producing portions 142 of specific size. For random weight portions, the cylindrical vertical blade 88 may be removed, allowing the outer dimension to vary. Additionally, the cutter 4 may be configured to simply make cheese quarters, cutting two and one-half cheese wheels 6 per minute. The vertical blades 96 may be increased from the above-discussed number to result in a sustainable fifty exact or random weight wedges per minute in an acceptable shape for packaging by a CryO-Vac machine. In some embodiments, waste resulting from using a band saw maybe decreased by at least 25% for exact weight wedges and at least 15% for random weight wedges. For random and exact weight portions, the cutter 4 may section two cheese wheels 6 per minute.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method of cutting a cheese wheel having a central axis into wedges comprising:
   providing a cheese wheel having a flat end and the curved periphery;
   cutting through the cheese wheel with multiple cutters in a first direction to cut a plurality of slabs substantially parallel to the ends of the wheel and abutted one against the other; and
   cutting through the abutted slabs with multiple cutters disposed to cut each slab into a plurality of wedges each having an end with a peripheral curved surface.

2. A method in accordance with claim 1, comprising:
   trimming the curved periphery of the cheese wheel to a substantially uniform diameter so that the wedges are of substantially equal weight and size.

3. A method in accordance with claim 1 comprising:
   providing sliced wedges of varying sizes and weights resulting from the differences in radial distance of the curved periphery from a central axis of the cheese wheel for respective wedges cut from the same cheese wheel.

4. A method in accordance with claim 1, comprising:
   cutting the cheese wheel with cutters that are staggered to cut the cheese wheel to avoid substantial compressing of the cheese between adjacent cutters.

5. A method in accordance with claim 4, wherein the cutters are staggered knives for engaging the cheese at successive intervals in time.

6. A method in accordance with claim 1, comprising:
   positioning the cheese wheel with the central axis of the cheese disposed vertically;
   cutting through the cheese wheel with a first set of knife cutters that move relative to the cheese wheel in spaced, substantially horizontal planes to cut the cheese wheel into the slabs.

7. A method in accordance with claim 6, comprising:
   cutting through a cheese wheel with a second set of knife cutters moving relative to the cheese wheel in substantially vertical planes to cut through the slabs to cut the respective slabs into wedges.

8. A method in accordance with claim 7, comprising:
   cutting the cheese wheel with profile knives moving vertically to profile the outer peripheral surface of the cheese wheel into a uniform diameter cylindrical surface.

9. A method of cutting a cheese wheel having a central axis into wedges comprising:
   positioning the cheese wheel into position at a cutting station;
   moving the cheese wheel relative to a first set of cutters to cut the cheese into slabs at the cutting station;
   moving a second set of cutters relative to the slabs to cut the slabs into wedges; and
   transferring cut wedges from the cutting station to allow positioning of another cheese wheel into the cutting station.

10. A method in accordance with claim 9, wherein the cutting into slabs comprises:
    staggering the cutters and their engagement with the cheese wheel so as not to compress the cheese between adjacent cutters moving through the cheese.

11. A method in accordance with claim 9, wherein the cutters for cutting the slab are staggered knives movable in a horizontal direction relative to the cheese wheel and wherein the cutters for cutting the cheese wheel into wedges comprise staggered knives in the vertical direction, and moving the staggered knives to necessarily engage the cheese wheel.

12. A method in accordance with claim 9, comprising:
    pushing the cheese through the first set of cutters to form the slabs.

13. A method in accordance with claim 12,wherein the pushing of the cheese comprises:
    pushing the cheese through stationary cutters.

14. A method in accordance with claim 9, comprising:
    placing the cheese slabs on a cutting support; and
    cutting the cheese with vertically moving cutters to form the wedges stacked on the cutting support.

15. A method in accordance with claim 14, comprising:
    moving vertically traveling staggered cutter comprising:
    knives in a vertical direction to cut the cheese on the support to form the wedges stacked on the cutting support.

16. A method in accordance with claim 15, comprising:
    moving the vertical traveling, staggered knives to a position below a lower end for the cheese wheel; and
    transferring the cheese wedges by pushing the cheese from the support while the vertical knives are below the level of the cheese wheel.

17. A method in accordance with claim 9, comprising:
    after cutting the cheese wheel into slabs, trimming the outer curved surface of the wheel to form a substantially uniform diameter profile whereby the cut wedges are substantially identical in size and weight.

18. A method of cutting a cheese wheel having a central axis and an outer peripheral curved surface into wedges comprising:
    conveying the cheese wheel into a cutting station;
    pushing the cheese wheel through horizontal cutting blades to form a stack of slabs resting on a cutting support;
    vertically traveling a profile cutter to cut the peripheral curved surfaces of the stacked slabs into a substantially uniform diameterforthe stack of slabs on the support;
    cutting the slabs with vertically traveling knives to cut the slabs into substantially equal wedges; and
    ransferring the cut wedges from the cutting station.

19. A method in accordance with claim 18, wherein the horizontal cutting blades are staggered in a vertical direction.

* * * * *